(12) United States Patent
Sanders et al.

(10) Patent No.: US 8,156,047 B1
(45) Date of Patent: *Apr. 10, 2012

(54) SYSTEM AND METHOD FOR FUNDING A COLLECTIVE ACCOUNT

(75) Inventors: Shelley F. Sanders, Landenberg, PA (US); Theodore Bowers, Greenville, DE (US)

(73) Assignee: JPMorgan Chase Bank, N.A., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/167,367

(22) Filed: Jun. 23, 2011

Related U.S. Application Data

(63) Continuation of application No. 13/082,691, filed on Apr. 8, 2011, which is a continuation of application No. 12/861,003, filed on Aug. 23, 2010, now Pat. No. 7,945,514, which is a continuation of application No. 10/193,923, filed on Jul. 15, 2002, now Pat. No. 7,809,641.

(60) Provisional application No. 60/307,594, filed on Jul. 26, 2001.

(51) Int. Cl.
*G06Q 40/00* (2012.01)
(52) U.S. Cl. .............................. 705/41; 705/14; 705/39
(58) Field of Classification Search ............... 705/41
See application file for complete search history.

(56) References Cited

U.S. PATENT DOCUMENTS

| | | | | | |
|---|---|---|---|---|---|
| 5,175,416 | A | * | 12/1992 | Mansvelt et al. | 235/379 |
| 5,466,919 | A | * | 11/1995 | Hovakimian | 705/17 |
| 6,112,191 | A | * | 8/2000 | Burke | 705/41 |
| 6,128,599 | A | * | 10/2000 | Walker et al. | 705/14.27 |

* cited by examiner

*Primary Examiner* — Charles Kyle
*Assistant Examiner* — Clifford Madamba
(74) *Attorney, Agent, or Firm* — Goodwin Procter LLP

(57) ABSTRACT

A system and method for funding a collective account such as a charitable account includes issuing a plurality of financial instruments, linking the financial instruments to the collective account, aggregating individual financial instrument usage, calculating a bonus or other reward based on the aggregate financial instrument usage and funding or distributing the reward to the collective account. According to the invention, members of a civic, charitable, political or other entity may generate collective rewards or other benefits which may be attributed to the designated organization.

22 Claims, 4 Drawing Sheets

SYSTEM AND METHOD FOR FUNDING A COLLECTIVE ACCOUNT

CLAIM OF PRIORITY

This application is a continuation of U.S. Ser. No. 13/082,691, filed Apr. 8, 2011, which is a continuation of U.S. Ser. No. 12/861,003 filed Aug. 23, 2010, now U.S. Pat. No. 7,945,514, which is a continuation of U.S. Ser. No. 10/193,923, filed Jul. 15, 2002, now U.S. Pat. No. 7,809,641, which claims the benefit of U.S. Ser. No. 60/307,594, filed Jul. 26, 2001, the contents of all of which are incorporated herein by reference in their entirety.

FIELD OF THE INVENTION

The invention relates generally to collective benefits derived from the use of financial instruments, such as MASTERCARD®, VISA®, DISCOVER® and AMERICAN EXPRESS® credit cards, ATM banking cards, debit cards, gift cards, smart cards, proximity type devices (i.e. such as SPEEDPASS® type devices) and other financial instruments such as demand deposit accounts, brokerage accounts and the like as detailed further herein. More specifically, the invention relates to a system and method for aggregating benefits to fund a collective account, the collective account representing, for instance, charitable contribution funds, political funds, educational expense or other funds.

BACKGROUND OF THE INVENTION

Financial transaction cards and devices, such as commercial credit cards, debit cards, transfer funds cards, private label cards, proximity type devices (i.e. such as SPEEDPASS® devices) and stored value cards are widely used for payments, cash advances and other financial transactions. With financial transaction cards, data for identifying the customer, such as an account number, a security code, or other identifying data is typically magnetically stored on a magnetic tape or strip embedded into the back-side of these types of instruments. When a transaction is to be performed at a retail store or other channel, a customer may hand his or her card to an employee of the retail store for scanning the magnetic information into a communication device. When a credit card is utilized in a bank, in order to receive a cash advance, the transaction may for instance be handled by either a teller or an automated teller machine (ATM). In the case of an ATM, the card is placed inside the ATM and the card owner enters a personal identification number (PIN) which is transmitted to the credit card company along with the transaction information. When the PIN is found to be incorrect, most credit card companies send to the card owner a request to re-enter the PIN. Financial transaction cards used herein may also include smart cards, i.e., cards having electronic circuits thereon.

Some card issuers have offered incentive programs to increase the use of their cards. For example, credit card rebate systems such as the DISCOVER® card or the like, may provide a rebate or rewards point program tied to general card usage. The rebate is enjoyed by the cardholder who receives a check or credit on his or her account. Others have suggested credit card systems that transfer a predetermined amount of money to an investment account periodically and bill the cardholder through the credit card account. For example, U.S. Pat. No. 5,787,470 describes a credit card system in combination with a rebate that is transferred to an investment account. However, among other limitations, existing cards provide bonuses or rebates based only on individual card usage. Moreover, the benefit or rebate is only enjoyed by the cardholder who receives a check or credit on his or her account.

Generally, processing of charitable and other civic, donation-type or other contributions requires considerable time and resources to scout out contributions, to solicit pledges on behalf of fundraising organizations, to have contributors fill out a pledge card, and to have contributors honor their pledges. Considerable time and resources are also required to process a pledge made by cash or check to get the funds into the fundraising organization's or the recipient's account. Processing charitable contributions also involves other costs such as the use of volunteers to open envelopes, count cash contributions and gifts, segregate cash contributions and gifts, deposit costs associated with depositing cash into a fundraising organization account, and the like.

Some have suggested the use of financial transaction cards in connection with methods and systems for making charitable contributions. For example, U.S. Pat. No. 5,696,366 to Ziarno (Ziarno) describes a method and system for streamlining the giving of contribution and gift commitments. Ziarno describes a method and system that require the use of a terminal in fundraising events for the solicitation and receiving of contributions and gifts. The terminal is a hand held unit with a wire-less communication link that includes a card processor, a card reader and accompanying circuitry that can read smart cards. The terminal accepts cash currency contributions, and card contributions.

However, no organized manner to fund selective charitable or other accounts based on collective, multi-party activity exists.

SUMMARY OF THE INVENTION

The invention overcoming these and other problems in the art relates in one regard to a system and method for automated funding of a collective account, for instance generating a bonus or other reward calculated based on an aggregate usage of a plurality of individual financial instruments that are linked to the collective account.

It is another feature of the invention to provide a financial instrument that is linked to an individual account and to a collective account, for funding the collective account with a bonus that is calculated based on an aggregate usage of all financial instruments linked to the collective account.

It is yet another feature of the present invention to provide a method and system for facilitating the giving of charitable contributions.

One aspect of the present invention relates to a method and system for funding a main or collective account comprising issuing a plurality of financial transaction instruments, linking the instruments to the collective account, aggregating individual usage of all linked instruments, calculating a bonus based on the aggregate instrument usage and funding the bonus to the collective account. The funds in the collective account may be used for a variety of purposes, such as making charitable contributions, funding political campaigns, making contributions to religious or civic groups or paying educational expenses.

Another aspect of the present invention relates to a collective financial transaction card, also referred to hereafter as a collective card (CC). The collective card may include means for operatively linking the card to an individual account, and to a collective account via conventional card reader devices. For example, the collective card may include one or more integrated circuits and a communication port for communicating with conventional card readers. For example, the communication port may be a contact or contactless interface.

The collective account may be funded with incentives or rewards value, such as a bonus or rebate or other type of value such as frequent flier miles or the like. The bonus or rebate may be calculated based on an aggregate card usage of all collective cards that are linked to the collective account. Alternatively, the collective account may also be funded with direct contributions made by the cardholders on a periodic basis or at random intervals.

The present invention also provides a more efficient, less costly method and system for making and managing contributions to collective accounts such as accounts of charitable or other fundraising organizations. Other features and advantages of the present invention will become apparent from the description of the embodiments in conjunction with the following figures.

DETAILED DESCRIPTION OF PREFERRED EMBODIMENTS

Figure 1:
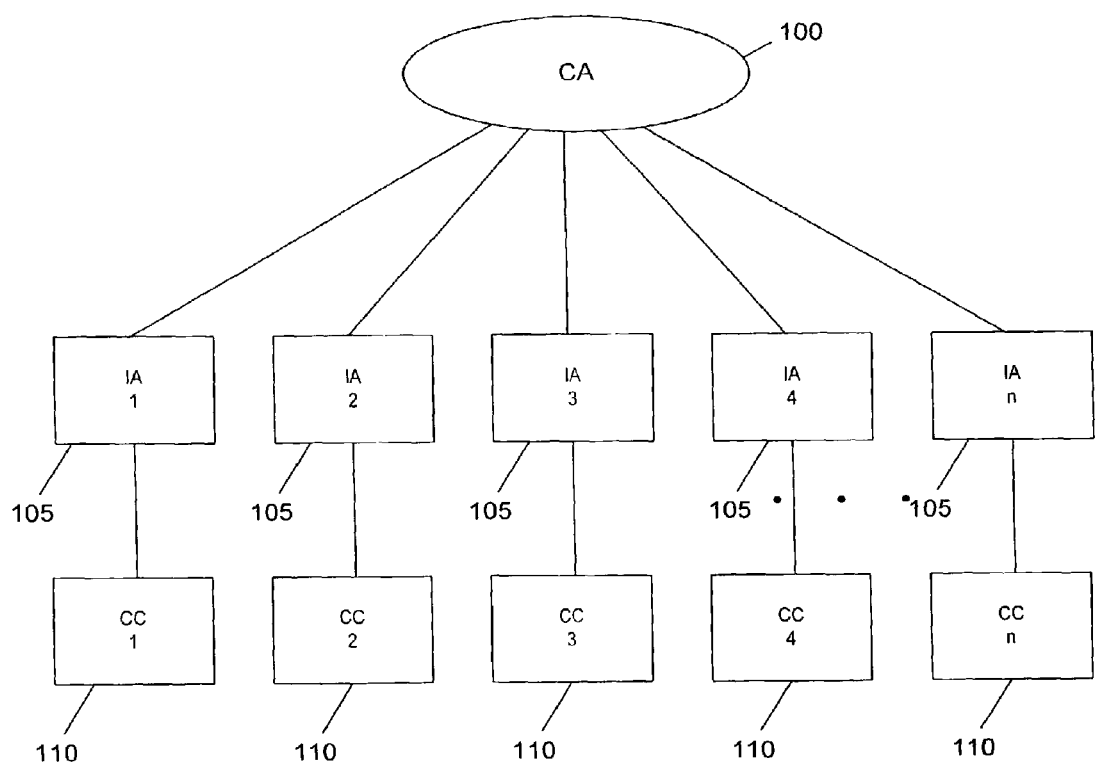
FIG. 1 is a diagram of one embodiment of the present invention illustrating a plurality of collective cards linked to an individual account and to a collective account.

The invention relates generally to a system and method for funding a collective account based on the use of selected financial instruments. As used within the present invention and as detailed further below, a collective account may be any of a variety of accounts or other means for storing, pooling or tracking any value or credits which may be awarded to a customer. As further used and detailed herein, a financial instrument may be any of a variety of devices, cards and accounts. For example, a financial instrument in accordance with the present invention may include collective cards which may include credit cards, such as MASTERCARD®, VISA®, DISCOVER® and AMERICAN EXPRESS® credit cards, ATM banking cards, debit cards, gift cards, smart cards, proximity type devices (i.e. such as SPEEDPASS® type devices) and other instruments such as traditional checks and other commercial paper. Additionally, as used in accordance with the present invention, a financial instrument may include accounts such as, for example, demand deposit accounts, brokerage accounts, mutual fund accounts, money market accounts, telephone card accounts, wireless telephone accounts, frequent flier accounts and the like.

In one embodiment of the invention, processing may include issuing a plurality of collective cards, and linking each collective card to an individual account and to the collective account. The invention may further include aggregating card usage for all linked cards in the collective account. A bonus or other financial or non-financial reward may be calculated based on the aggregate card usage in the collective account, and the reward funded to the collective account. The above processing can be accomplished in real lime, or on a periodic basis. The funds in the collective account may be used for a variety of purposes including funding of member activities, various accounts of a civic, political, religious or other organization, or accounts of other organizations such as charitable organizations. For example, if the organization is a political party the funds may be used to fund political campaigns or other activities of members of the political party.

Another embodiment of the present invention is directed to a method and system for making charitable contributions based on aggregate card usage by the members of an organization that may carry a collective card. The contributions may generate a bonus or other reward or value that may be calculated on a periodic or other basis, based for instance on an aggregate card usage by the members of the organization during a period. The contributions may be distributed to one or more charitable organizations or other fundraising organizations as designated by the donating organization. Individual card usage may be monitored in the collective account and a bonus or other reward may be calculated based on a formula such as, for example, as a percentage of the total card usage over a selected time period. The bonus or other value or reward may be periodically funded to the collective account. Accumulated funds in the collective account may be periodically distributed to one or more accounts of charitable institutions.

For example, a cardholder of a collective card may designate a charitable organization to receive a portion of the total reward that corresponds to that cardholder's individual card usage. Alternatively, a cardholder may select a charitable organization from a list of charitable organizations that are associated with the collective account. The selection may be made in the application for obtaining the collective card or at another time. The application form may be a paper form mailed to the members of an organization, or an electronic form accessible at a website. Alternatively, a customer may apply for a collective card via an automated telephone system. Other well known conventional ways for opening an account linked to a financial transaction card may also be used.

According to another embodiment of the present invention, a conventional financial transaction card can be linked to a collective account upon express authorization by the cardholder. For instance, an issuer of a credit card such as a bank may establish a plurality of collective accounts and designate each collective account for a particular purpose, such as an environmental protection fund, a charitable contribution account, an educational account, etc. The issuer of the credit cards may then contact existing customers and offer them the option to add the collective feature, i.e., linking their account to a collective account of their choice.

Upon authorization by the cardholder, the issuer of the credit cards may link the credit card account to the selected collective account for funding the collective account with a bonus calculated based or an aggregated card usage of all credit cards linked to the selected collective account. Cardholders of the individual cards linked to a collective account need not necessarily all be members of the same organization. The organization may be the direct holder of the collective account, may designate one or more charitable or other organizations to receive the funds from the collective account, may deposit the funding or value into escrow, or otherwise dispose of or use the value represented by the account.

Optionally, individual cardholders may make additional contributions to the collective account, on a regular periodic basis, or at random intervals. Reports or statements may also be issued to each cardholder or the organization reporting the amount of the charitable contribution and the recipient charitable organizations, on a periodic or other basis. These statements may also be combined with regular account activity statements.

Yet another embodiment of the invention relates to a computer-based system for funding a collective account. The system may include a plurality of financial transaction cards linked to a plurality of individual accounts and to a collective account. Each card may include means for operatively linking the card to at least one individual account and to a collective account. For example, the card may be a magnetic card having one or more permanent or programmable memory means such as magnetic stripes that contain information for accessing the accounts linked to the card. The memory means can be read by conventional card reader devices. Alternatively, the card may be a smart card comprising one or more integrated circuits (ICs) and a communication port for exchanging information between the card and an external reader. The communication port may be a contact or contact-less interface.

The system may further include a central computer comprising hardware and software for monitoring individual card usage, aggregating card usage, and calculating a bonus based on the aggregate card usage of all accounts linked to a collective account. The central computer may also control the funding of the collective account with the bonus, distributing the accumulated funds in the collective account to other accounts, and generating statements of individual, and collective card activity to the cardholders, and to the holder of the collective account.

Figure 2:
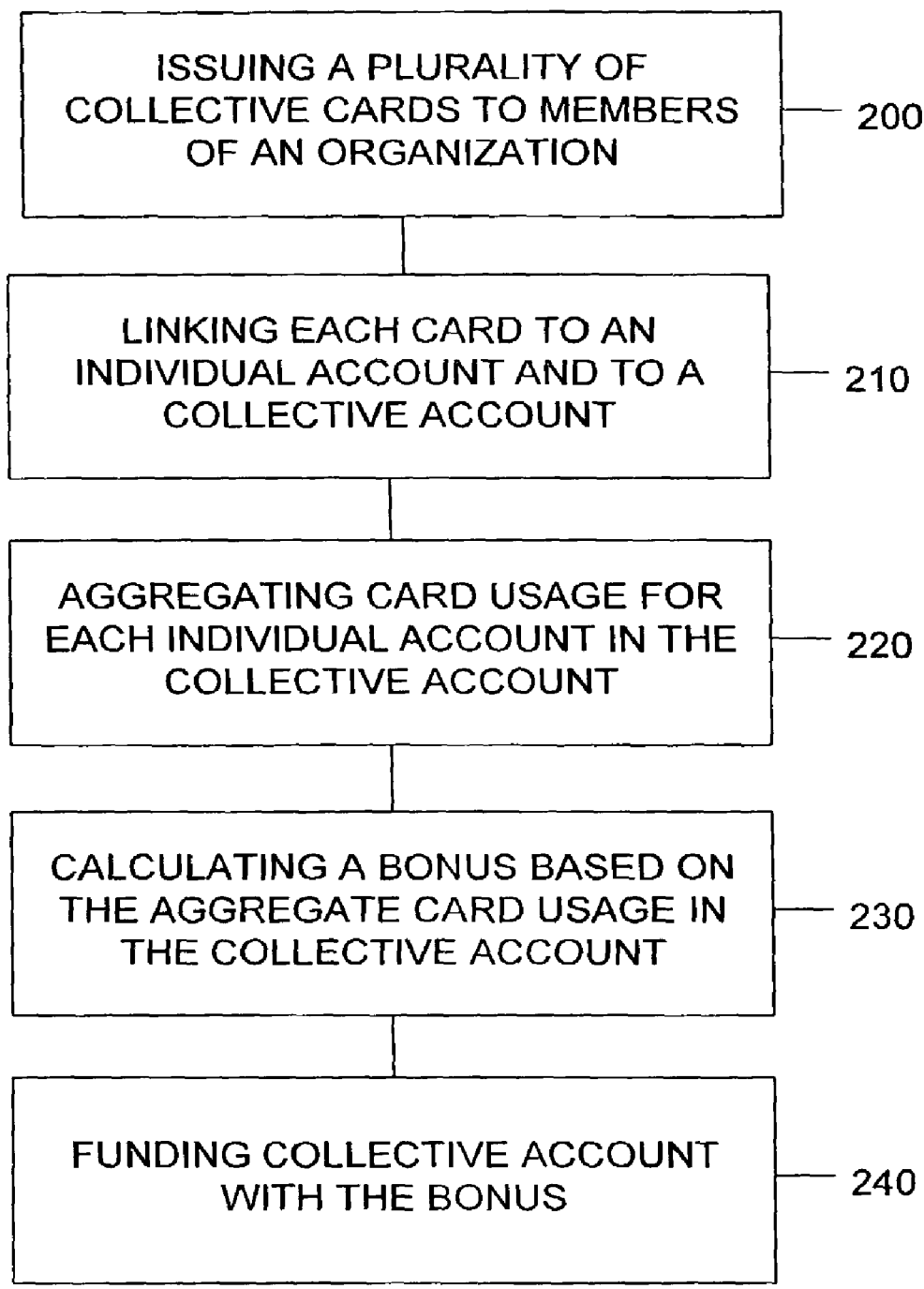
FIG. 2 is a flowchart illustrating an embodiment of the invention.

Referring now to FIGS. 1 and 2, an embodiment of the invention is illustrated for funding a collective account (CA), such as a charitable contribution account. The system comprises a plurality of collective cards 110, each card being operatively linked to at least one individual account (IA) 105. Also, each individual account 105 may be operatively linked to a main or collective account 100. Alternatively, the collective card may include means for linking the card directly to a collective account. Typically, an entity such as a financial institution may issue a plurality of collective cards 110 to members of an organization (block 200), and link each collective card to an individual account 105 and to the collective account 100 (block 210). The method may further include steps of aggregating card usage for every individual account in the collective account (block 220), calculating a bonus based on the aggregate card usage in the collective account (block 230), and funding the collective account with the bonus (block 240).

An organization can be any entity having a set of members formed for the pursuit of a common goal or objective. Examples may include families, business organizations, trade organizations, political parties, religious organizations, athletic organizations, professional societies, research organizations, educational organizations, social services organizations or many other types of entities. Further examples of organizations include lobbying groups, Political Action Committees (PACs) and consortiums or alliances of smaller interested groups. Typically, the organization will be the holder of the collective account. However, the holder of the collective account may be a different organization from the organization whose members are the cardholders of the collective cards. For example, a bank may issue collective cards to members of an educational institution, and link the cards to a collective charitable contribution account. The holder of the collective account may be directly the recipient charitable organization. The funds in the collective account may be used by the organization for a variety of purposes such as to fund its own activities. The funds may also be used for funding accounts of other organizations. For example, the organization may use the funds for making charitable contributions to one or more charitable organizations, or other fundraising organizations.

The collective account may also include one or more sub-accounts, each sub-account being designated for a different purpose. A cardholder of a collective card (i.e., a card that is linked to a collective account), may direct his or her contribution to one or more of the sub-accounts. In another embodiment, a collective card may be linked to one or more collective accounts. The bonus or other value may be distributed equally among these accounts or according to some predetermined formula.

Cardholders of a collective card according to the invention may select which account or sub-accounts may receive the bonus funds or other value. Thus, the purpose or use of the bonus funds may vary and may be determined by the individual cardholders, the issuing bank, or the organization whose members are issued the individual collective cards. Monitoring of individual card usage, aggregating card usage, calculating the bonus, and funding of the collective account may be done in real time, or on a periodic basis using conventional computerized means. Additionally, awards and credits for card holders may be adjusted over selected periods of time to encourage funding the collective account. For instance, awards and credits for card holders may be increased during fundraising events or during seasons of the year during which spending is expected to increase. The invention may include a central computer including hardware and/or software for accomplishing these functions.

Figure 3:
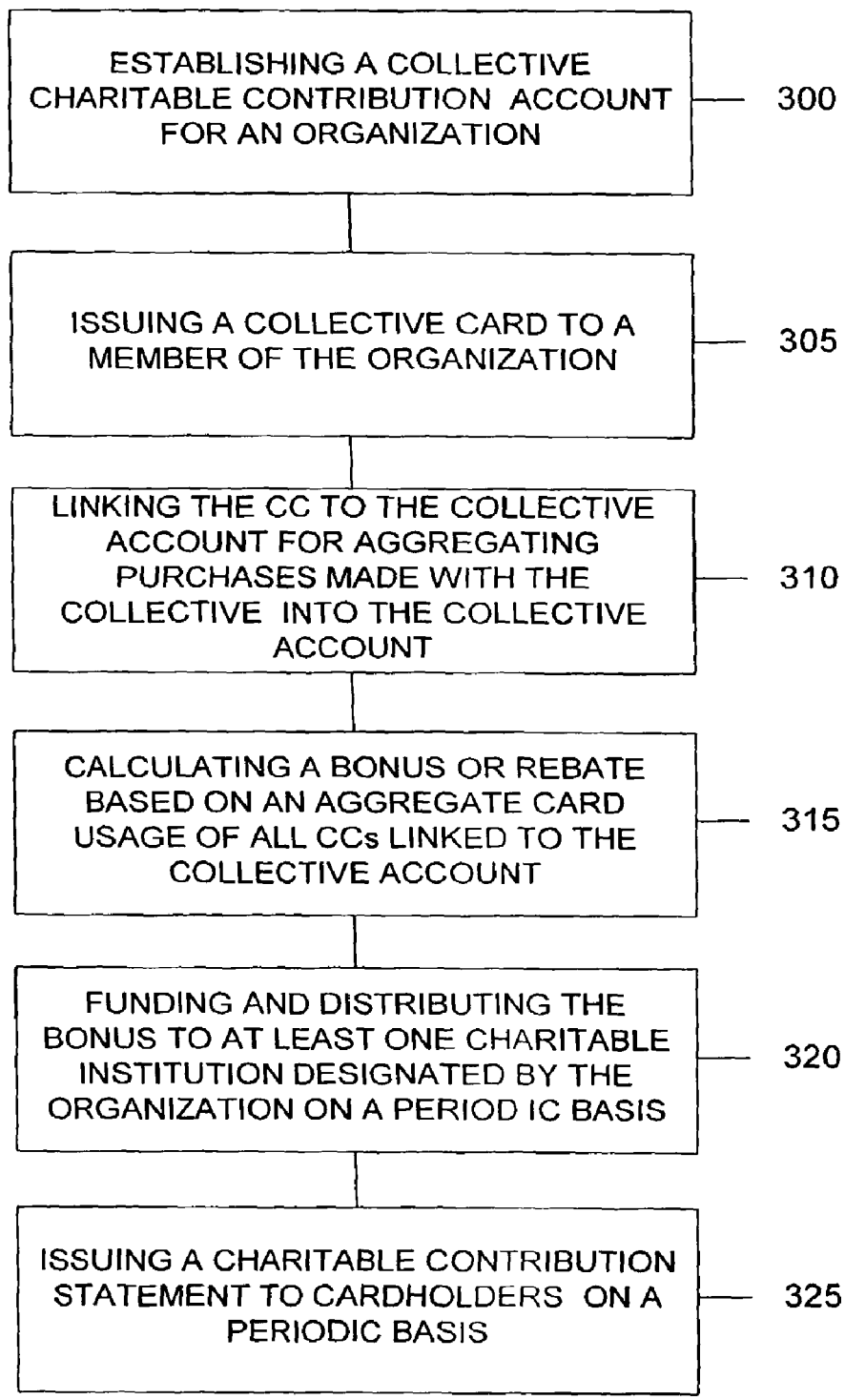
FIG. 3 is a flowchart illustrating an embodiment of the invention in another regard.

Referring to FIG. 3, an embodiment of the invention is illustrated that includes establishing a collective account for making charitable or other contributions for an organization (block 300). A financial institution such as a bank may issue a plurality of individual collective cards 110 to members of the organization or others that desire to receive the collective card (block 305). Each collective card 100 may be linked to at least one individual account for monitoring individual usage of the card, and billing, according to conventional systems and methods. Each collective card 110 may also be linked to the collective account 100 for aggregating purchases made with the collective card in the collective account 100. The invention further may include calculating a bonus or other reward based on an aggregate card usage of all collective cards linked to the collective account (block 315).

The invention may further include distributing the calculated bonus to at least one charitable institution designated by the organization on a periodic basis (block 320). The invention may likewise include issuing charitable contribution statements to the cardholders on a periodic basis (block 325). Individual card usage may be monitored and aggregated in the collective account in real time or by selected categories of interest.

A charitable or other reward may be calculated in a number of different ways, including, for example, based on a designated percentage of the aggregate card usage over a selected period of time. Additionally, card usage may be measured in a number of different ways such as, for example, the total value of the goods or services purchased for a month. The amount of the bonus or other reward may be designated and funded by the card issuer, or the organization that is the holder of the collective account. A reward program might, illustratively, be set up to generate rewards based on certain percent of the total purchase value of the goods or services purchased over a period (i.e. 1% of the total purchases made), or other ranges or calculations might be employed to structure the reward. Further, rewards may be graduated depending on the level of card activity and based on preset award amounts (i.e. a $20 award based on card usage exceeding $1000 and a $40 award for card usage over $1500). Additionally, rewards could be graduated and granted based on selected customizable dates or events such as for a fundraising drive or for selected holidays and seasons. Such awards may also be made on a one-time basis, for instance, upon the purchase of a house or upon registering for a specific promotion. For awards based upon demand deposit accounts, brokerage accounts and the like, rewards may be based upon, for example, maintaining certain levels of balances over selected periods of time or making certain amounts of deposits.

It is important to note that each card and each charitable account is not restricted to any single type of award or method of funding. Further, it is important to note that each card and each charitable account is not limited having only a single vendor as the source for granting the awards and funding. For instance, a charitable or other reward may be accumulated using a combination of programs which may be awarded by multiple, independent vendors. For example, a single card holder may receive a first award to a charitable account which is awarded by a first vendor and calculated, for instance, as a designated percentage of the aggregate card usage over a selected period of time. Additionally, the same card holder may receive a second award to the same charitable account which is awarded by a second vendor based upon, for instance, the occurrence of a specific event (i.e. staying at a specific hotel, flying a specific airlines, purchasing a home from a specific broker). Accordingly, the present invention is not limited to any specific combination of programs, awards or vendors.

For each cardholder, the period for updating the main account of the individual card usage, calculating and distributing the reward may vary depending on a number of factors, for example, financial or tax considerations of the individual cardholder or the holder of the collective account. For example, individual cardholders may prefer an annual distribution of the charitable bonus contributions prior to the end of the fiscal year in order to be able to claim a tax deduction for that year.

Optionally, on an annual basis or after some other time period, a statement may be forwarded to the holder of the collective account and to each cardholder of a collective card itemizing all contributions given, e.g. to charitable organizations, for tax purposes, or otherwise. The statement may be formatted so that a tax processing entity, e.g. the United States Internal Revenue Service (IRS) or a state tax body, will accept the information for substantiating the contribution at issue, and/or grant a charitable contribution deduction. It will be understood that records of the contribution made by a number of cardholder contributors can be processed and forwarded to each respective cardholder contributor for meeting contribution or gift quotas and for substantiating charitable contribution or gift deductions.

A charitable account may be used to fund a corresponding charitable organization i.e., an organization that is awarded nonprofit status by the IRS or other body. For example, in the United States, charitable organizations may include nonprofit tax exempt organizations that are classified under appropriate sections of the federal tax code. This classification is a reliable indicator of the tax deductibility of contributions and gifts. Charitable organizations for example may include public charities and private foundations. Typically, a public charity may solicit funds from the public and use the funds to sponsor or support social, educational, or religious activities, or engage in activities that provide for relief for distressed or underprivileged individuals.

The group of charitable organizations may illustratively include churches, conventions or associations of churches; educational organizations; hospitals and medical research organizations; organizations created to benefit state and municipal colleges and universities that normally receive their support from the government or the general public; and other publicly supported organizations such as museums, libraries, support groups for cultural organizations, organizations for the gathering of contributions and gifts for research into and the elimination of medical disorders, and organizations that provide direct services to the public.

Fundraising organizations also include organizations that receive the majority of their support from activities relating to their tax exempt functions, such as a museum's receipts or tuition paid to an educational institution. Fundraising organizations or gifts recipients also include public television, radio and other forms of media organizations that derive support from the public by way of contributions and gifts.

Fundraising organizations also include those organized exclusively to support other qualified public charities, such as churches, schools, and hospitals; those operated for the purpose of testing products for public safety; and private foundations established to maintain or aid social, educational, religious, or other charitable purposes.

A "fundraiser" or "fundraising organization" may be a private foundation; a tax exempt corporation; a not-for-profit corporation; an organization organized and operated exclusively for religious, charitable, scientific testing for public safety, literary or educational purposes to foster national or international amateur sports competition, and/or for the prevention of cruelty to children or animals; a civic league; an organization not organized for profit but operated exclusively for the promotion of social welfare; and, private for profit an not-for-profit organization that gather a contribution or gift on behalf the above mentioned organizations. Exemplary organizations may include the Red Cross, the Boy Scouts, the Girl Scouts, Salvation Army, American Heart Association, American Diabetes Association, United Way Crusade of Mercy, high schools, grammar schools, colleges, museums, and fundraising arms of other organizations, and the like.

A "fundraising organization" and/or "fundraiser" also may include a political organization, a party, committee, association, fund, or other organization, fund, or other organization (whether incorporated or not) organized and operated primarily for the purpose of directly or indirectly expenditure, or both, for an "exempt function." An exempt function may include the function of influencing or attempting to influence the selection, nomination, election, or appointment of an individual to any Federal, State, or local public office or office in a political organization, or the election of Presidential or Vice-Presidential electors, whether or not such an individual or electors, whether or not such an individual or electors are selected, nominated, elected, or appointed; and, a campaign committee, and/or a fund established for the nomination or election of an individual to a Federal, State, or Public office.

Figure 4:
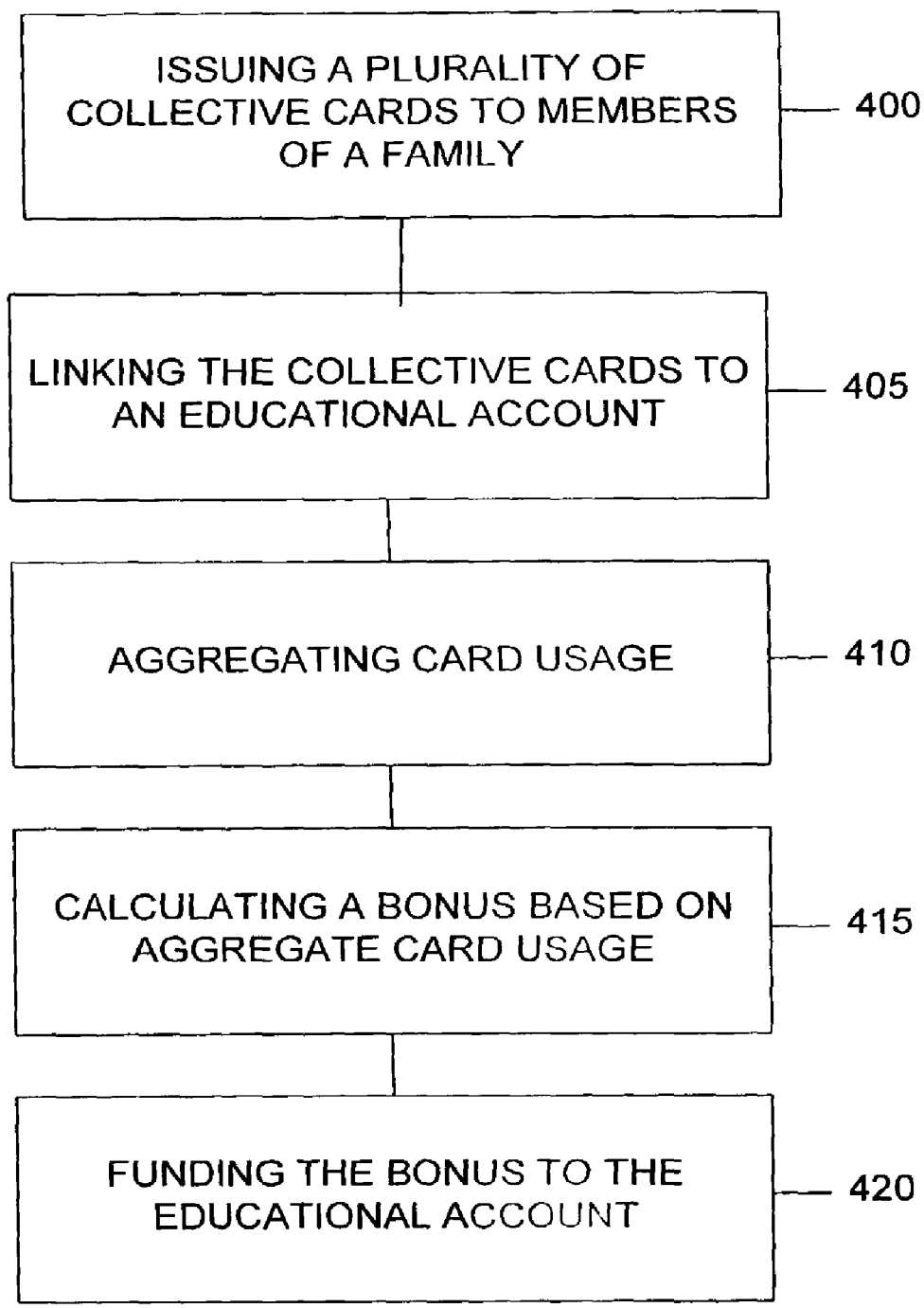
FIG. 4 is a flowchart illustrating an embodiment of the invention in another regard.

Another illustrative embodiment of the invention is illustrated in FIG. 4, in which a plurality of collective cards are issued to members of a family (block 400). A family may be a group of individuals living under one roof such as a traditional family, or a group of common ancestry, or group of people united by certain convictions or a common affiliation. The cards are linked to a collective account (block 405). The funds in the collective account may be used for a variety of purposes, for example, the collective family account may be an educational account that can be used to pay family educational expenses and may qualify for preferential tax treatment under existing tax laws. The collective account may also be a family savings account, a family investment account or a special tax free or tax deferred account (i.e. a 529 account, 401(k) account, or a Roth IRA account). The invention further includes steps of aggregating card usage (block 410) and calculating a bonus or other reward based on the aggregate card usage (block 415), and funding the educational account with the bonus (block 420). Family members may also make independent contributions to the collective family account either on a regular periodic basis, or at random intervals.

The funds in the collective family account may also be used for more than one purpose, e.g., a part of the funds may go to a charitable organization, another part may go to an educational fund account, another part may go to an investment account, and yet another part may go to a retirement or medical account, etc. Also, family members may be able to direct where their bonus contributions go.

The invention may also employ conventional security means for ensuring that the security and privacy of the individual accounts is not compromised.

Thus, personal information in an individual account would not be accessible by other cardholders or by the organization itself, without the express consent of individual cardholders. For example, a collective family account may allow the head of the family or the holder of the collective family account to view monitoring of individual card activity, typically in a combined statement. Typically, however, individual card usage data may be electronically monitored in the collective account for purposes of calculating a bonus based on an aggregate card usage of all linked cards, without divulging personal cardholder information.

In another embodiment of the invention the collective card may be a smart card that may include means for storing transactional data, i.e., data related to transactions involving the account associated with that card. Examples of such transactional data include the amounts of money spent on certain goods or services, the names of the establishment where such transaction takes place, the date and time of such expenditures, and the like. Moreover, each card may be associated with a single individual or multiple individual accounts. The individual account or accounts linked to each card may be automatically updated as transactions occur. The individual smart card also may communicate with other devices using a wireless link.

The foregoing embodiments have been presented for the purpose of illustration and description only, and variations in implementation will occur to persons skilled in the art. For instance, as detailed earlier above, although the present invention has been discussed primarily with respect to the use of collective cards, the present invention has been designed and is intended for use with any of a variety of financial instruments including demand deposit accounts, brokerage accounts, mutual fund accounts, money market accounts, telephone card accounts, wireless telephone accounts, frequent flier accounts and the like without limitation. The scope of the invention is intended to be limited only by the claims appended hereto.

What is claimed is:

1. A computer-implemented method for allocating rewards among reward accounts, the method comprising:
   providing, by a computer processor, one or more interfaces that perform the operations of,
   presenting an option for a user to link a plurality of user accounts associated with separate and independent financial instrument accounts to a reward account;
   receiving an indication to link one or more of the plurality of user accounts to the reward account;
   presenting an option for a user to link the reward account to one or more sub-reward accounts; and
   presenting an option for a user to adjust an allocation of rewards among the one or more sub-reward accounts, and
   providing a reward calculation unit that performs, by a computer processor, the operations of,
   monitoring the plurality of user accounts for indications of rewardable transactions;
   calculating a reward based on an aggregate of a plurality of indications of rewardable transactions associated with two or more of the plurality of user accounts; and
   allocating the reward to the reward account according to the adjusted allocations.

2. The method of claim 1, wherein the one or more interfaces further perform the operation of presenting an option to change link the plurality of user accounts to a second reward account.

3. The method of claim 1, wherein the one or more interfaces further perform the operation of presenting an option to de-link the plurality of user accounts from the reward account.

4. The method of claim 1, wherein the reward is based on a percentage of balances accrued by the two or more of the plurality of user accounts associated with the indications of rewardable transactions.

5. The method of claim 1, wherein the one or more interfaces further perform the operation of presenting an option to increase a reward balance of the reward account.

6. The method of claim 1, wherein the rewards comprise a bonus, a rebate, frequent flier miles, credits, money, or combinations thereof.

7. The method of claim 1, wherein the reward account comprises a charitable account, member activities account, civic account, political account, religious account, educational account, savings account, investment account, tax free account, tax deferred account, or combinations thereof.

8. The method of claim 1, wherein the one or more interfaces are communications ports.

9. The method of claim 1, wherein one of the one or more interfaces is a reading device.

10. The method of claim 1, wherein the reward comprises a bonus, rebate, frequent flier miles, and combinations thereof.

11. The method of claim 1, wherein the reward comprises a discount, a coupon, and combinations thereof.

12. A system for allocating rewards among reward accounts, the system comprising:
    one or more interfaces that perform, by a computer processor, the operations of,
    presenting an option for a user to link a plurality of user accounts associated with separate and independent financial instrument accounts to a reward account;
    receiving an indication to link one or more of the plurality of user accounts to the reward account;
    presenting an option for a user to link the reward account to one or more sub-reward accounts; and
    presenting an option for a user to adjust an allocation of rewards among the one or more sub-reward accounts, and
    a reward calculation unit that performs, by a computer processor, the operations of,
    monitoring the plurality of user accounts for indications of rewardable transactions;
    calculating a reward based on an aggregate of a plurality of indications of rewardable transactions associated with two or more of the plurality of user accounts; and
    allocating the reward to the reward account according to the adjusted allocations.

13. The system of claim 12, wherein the one or more interfaces further perform the operation of presenting an option to change link the plurality of user accounts to a second reward account.

14. The system of claim 12, wherein the one or more interfaces further perform the operation of presenting an option to de-link the plurality of user accounts from the reward account.

15. The system of claim 12, wherein the reward is based on a percentage of balances accrued by the two or more of the plurality of user accounts associated with the indications of rewardable transactions.

16. The system of claim 12, wherein the one or more interfaces further perform the operation of presenting an option to increase a reward balance of the reward account.

17. The system of claim 12, wherein the rewards comprise a bonus, a rebate, frequent flier miles, credits, money, or combinations thereof.

18. The system of claim 12, wherein the reward account comprises a charitable account, member activities account, civic account, political account, religious account, educational account, savings account, investment account, tax free account, tax deferred account, or combinations thereof.

19. The system of claim 12, wherein the one or more interfaces are communications ports.

20. The system of claim 12, wherein one of the one or more interfaces is a reading device.

21. The system of claim 12, wherein the reward comprises a bonus, rebate, frequent flier miles, and combinations thereof.

22. The system of claim 12, wherein the reward comprises a discount, a coupon, and combinations thereof.

\* \* \* \* \*